United States Patent [19]

Dunning

[11] Patent Number: 4,486,172

[45] Date of Patent: Dec. 4, 1984

[54] OVEN AND METHOD FOR HEATING THERMOPLASTIC ARTICLES

[75] Inventor: Leonard A. Dunning, Whippany, N.J.

[73] Assignee: Allied Corporation, Morristown, N.J.

[21] Appl. No.: 193,686

[22] Filed: Oct. 3, 1980

[51] Int. Cl.³ .................. F27D 3/00; F27D 11/00; F27B 9/22; F27B 9/06

[52] U.S. Cl. ..................... 432/11; 219/388; 432/140

[58] Field of Search ............. 432/8, 11, 23, 59, 140, 432/198; 219/388

[56] References Cited

U.S. PATENT DOCUMENTS

| | | | |
|---|---|---|---|
| 2,061,910 | 11/1936 | Kingston | 432/198 |
| 3,203,677 | 8/1965 | Sabatino | 432/57 |
| 3,449,547 | 6/1969 | Goodman et al. | 219/388 |
| 3,476,840 | 11/1969 | Glassford | 432/8 |
| 3,811,828 | 5/1974 | Ohta et al. | 432/59 |
| 3,869,249 | 3/1975 | Frische | 432/121 |
| 4,004,138 | 1/1977 | Morooka et al. | 432/51 |
| 4,155,786 | 5/1979 | Corbic | 432/59 |

Primary Examiner—John J. Camby
Attorney, Agent, or Firm—Richard A. Negin; Jay P. Friedenson; Richard A. Anderson

[57] ABSTRACT

The present invention is an oven and method of operation for heating thermoplastic articles. Articles are fed into the oven on a conveyor belt. There is a heating plate directly beneath the article bearing surface of the conveyor belt which heats the supported side of the article. The surface of the article not in contact with the bolt is heated by conventional means within the oven.

21 Claims, 1 Drawing Figure

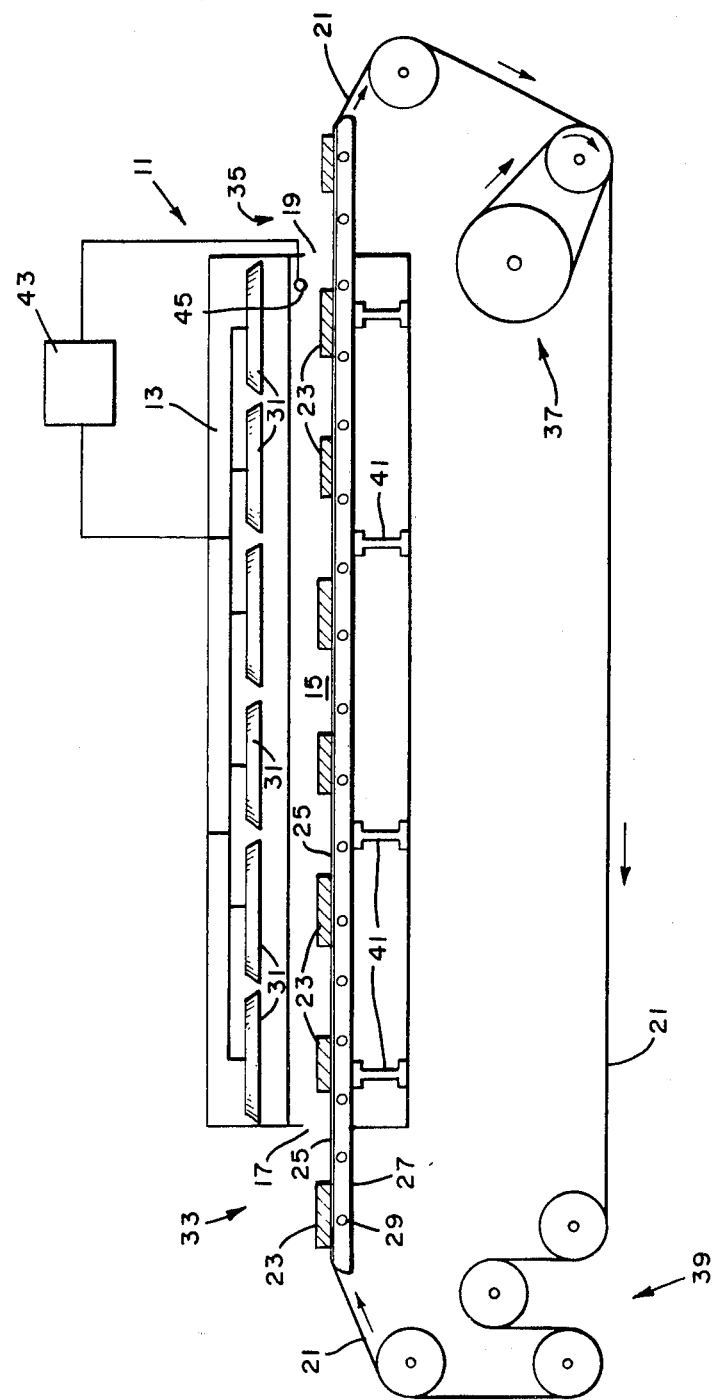

OVEN AND METHOD FOR HEATING THERMOPLASTIC ARTICLES

DESCRIPTION

BACKGROUND OF THE INVENTION

1. Field of the Invention

This invention relates to an oven and method for heating thermoplastic articles; more particularly, it is an oven and method for heating thermoplastic sheet for further shaping.

2. Description of the Prior Art

It is known that many thermoplastic polymers can be formed into shaped articles by various sheet metal forming techniques. These forming processes are economically very attractive because it is possible to achieve rapid production rates, e.g., rates that exceed one item a minute.

In one process, a thermoplastic sheet, reinforced with a fiber glass mat, woven cloth, or woven roving is preheated in an oven to above the softening point of the resin. The heated sheet, or blank, is transferred to a stamping press or compression molding press containing a matched metal die and formed into a shaped article. The article is then ejected from the die and removed from the press.

Difficulties have been encountered in ovens for heating thermoplastic articles. These difficulties relate to the uniform heating of the thermoplastic article and the handling of the thermoplastic articles as they are heated. Of particular concern are thermoplastic sheets used as stampable blanks. Some sheets become limp and difficult to handle when they are heated to temperatures above their softening point. Additionally, the sheets tend to stick to the supporting means in the oven. In order to compensate for the difficulties in handling of limp sheets and sheets that stick, ovens have been designed which compromise the uniform heating of the sheet.

One attempt to compensate for the sticking of the limp thermoplastic sheets to a conveyor belt which conveys said sheets through an oven has been disclosed in U.S. Pat. No. 4,181,551. In this patent, sheets are conveyed through an oven partially or totally by a fiberglass veil which eventually becomes incorporated into the sheet during the molding or stamping process. The thermoplastic sheet has a configuration in which a fiberglass veil is located at one surface of the molded product. The fiberglass veil affects the uniform heating, especially when infrared heating is used.

Other attempts have been made to avoid the sticking and handling problems and still maintain a uniform heating of the thermoplastic sheets or blanks. One such attempt is to place the blanks on metal plates, preferably aluminum coated with tetrafluoroethylene resin (TFE), and use a conveyor belt to convey the blanks on the plates from the inlet to the outlet of the oven. In this embodiment the metal plate carries the thermoplastic sheet or blank, and is itself conveyed on the conveyor belt through the oven. The metal plate is heated and, depending on its heat transfer characteristics, uniformly heats the supported side of the thermoplastic sheet.

Typically, thermoplastic sheets are conveyed on conventional metal link conveyor belts. These conveyor belts are comprised of metal strips, cables, bands, links, etc., connected together. There are openings between connected and adjacent metal pieces. The thermoplastic sheet or blank is supported on the linked metal conveyor. A heat source beneath the conveyor belt, such as an infrared heater, heats the supported surface, i.e., the surface in contact with the supporting belt of the thermoplastic article. As the thermoplastic article softens, it takes the impression of the conventional linked conveyor belt surface upon which it is supported. Further, the metal portions of the conveyor belt result in nonuniform heat transfer to the sheet.

It is desirable to provide an oven in which thermoplastic articles such as sheets or blanks can be heated uniformly with a minimum of sticking and handling problems resulting from the softness and limpness of the thermoplastic article as it is heated.

SUMMARY OF THE INVENTION

The present invention is an oven and method of operation for heating thermoplastic articles. The oven has an oven housing in which there is an oven chamber with an inlet and an outlet. A conveyor belt passes through the oven chamber. The conveyor belt has an article bearing surface. A heating plate is located directly beneath the article bearing surface to uniformly heat thermoplastic articles on the conveyor belt. There is a means to heat the oven chamber.

The oven can be used in a method to uniformly heat thermoplastic articles. The method includes feeding the thermoplastic articles into the inlet of an oven chamber on a conveyor belt. The articles are conveyed through the oven. The supported side of the thermoplastic articles are heated by a heating plate over which the conveyor belt travels. The surface of the thermoplastic articles not in contact with the belt is heated by conventional heating means within the oven chamber. The thermoplastic articles are collected as they pass from the oven outlet.

Thus, the general object of the present invention is to provide a new and improved oven and method for uniformly heating thermoplastic articles such as sheets and blanks with a minimum of handling difficulties.

BRIEF DESCRIPTION OF THE DRAWING

The attached FIGURE is a schematic, sectional view of an oven of the present invention.

DESCRIPTION OF THE PREFERED EMBODIMENTS

The present invention is an oven and method of operation for uniformly heating thermoplastic articles. In its most basic form the oven has an oven housing in which there is an oven chamber having an inlet and an outlet. A conveyor belt passes through the oven chamber. The conveyor belt has an article bearing surface. There is a heating plate located directly beneath the article bearing surface to uniformly heat the supported side of the thermoplastic article. Additionally, there is a means to heat the portions of the thermoplastic article not supported on the conveyor belt.

The attached drawing is a schematic sectional view of a preferred embodiment of the present invention. An oven 11 is used to uniformly heat thermoplastic articles. The oven has an oven housing 13 in which there is an oven chamber 15 having an inlet 17 and an outlet 19. A conveyor belt generally shown as 21 conveys thermoplastic articles such as sheets 23 through oven 11 from inlet 17, through oven chamber 15, and out of outlet 19.

The conveyor belt has an article bearing surface 25 upon which the thermoplastic sheets 23 are fed. There is a heating plate 27 located directly beneath the article bearing surface 25. As the conveyor belt moves through the oven the article bearing surface passes over and in direct contact with the heating plate 27. The heating plate 27 can be heated by any suitable means either directly or indirectly. Preferably, electric resistance elements 29 located within the heating plate 27 can be used to controllably heat the heating plate. Alternately, gas, induction or other suitable means can be used to directly or indirectly heat the heating plate 27. The heating plate can be made of any structurally suitable material which readily transfers heat. Steel, aluminum or copper are example materials, with aluminum being preferred.

There is a means to heat the surfaces and portions of the thermoplastic sheet 23 not in direct contact with the article bearing surface 25 of the conveyor belt 21. In the embodiment shown, infrared heaters 31 supply heat to the surface of the thermoplastic sheets not directly supported and in contact with the article bearing surface 25 which are heated via plate 27. Although infrared heaters are used, other types of radiant or space heating devices can be used to heat the oven chamber 15 and the thermoplastic sheets 23. When using infrared heating, heaters which can supply even full area heating of the article, without reflectors, are preferred. Typical of the full area heaters which can be used are those described in "Electric Radiant Heater" Bulletin No. 153 Reference 57-4 by Watlow Corp. 12001 Lockland Road, St. Louis, Mo. 63141. This bulletin describes a radiant heater panel made up of individual flat metal sheathed emitter strips. Although, these full area radiant heaters are preferred, infrared heaters with reflectors, such as tube or rod type heaters can be used.

In the embodiment shown in the attached drawing, the conveyor belt 21 extends beyond the oven housing 13 at the inlet 17 and at the outlet 19. This is the preferred embodiment or best mode. Alternatively, the whole conveyor belt can be located within the oven without portions extending beyond the inlet and the outlet where there are suitable feeding and removing means.

The conveyor belt 21 can have an inlet extension 33, extending beyond the oven housing 13 at the inlet 17. Thermoplastic articles can be placed on the conveyor belt at the inlet extension 33. There can be a plate beneath the conveyor belt at the inlet extension 33 for additional support. In the FIGURE, the heating plate extends beneath the inlet extension 33 of the conveyor belt for additional support. Preferably, heat to the heating plate beneath the inlet extension can be independently controlled from the remainder of the heating plate so that thermoplastic articles can be preheated while on the inlet extension 33 if desired.

Similarly, the conveyor belt 21 can have an outlet extension 35, extending beyond the oven housing 13 at the outlet 19. Thermoplastic articles can be collected from the outlet extension 35 after they are conveyed through the oven chamber 15. There can be a plate beneath the conveyor belt at the oven outlet for additional support. In the FIGURE, the heating plate extends beneath the outlet extension 35 of the conveyor belt for additional support. Preferably, heat to the heating plate beneath the outlet extension can be independently controlled from the remainder of the heating plate, so that the thermoplastic articles are maintained at a desired temperature while awaiting their removal from the conveyor belt. Having a plate beneath the outlet extension 35 is also preferred, since it provides additional support during removal of the thermoplastic articles which can be limp, sticky and otherwise difficult to handle. Additionally, having a plate beneath the outlet extension 35 or inlet extension 33 enables the conveyor belt 21 to be more easily cleaned while supported. This is particularly important when the conveyor belt is made of a thin flexible material.

Referring to the FIGURE, the oven chamber walls, heating plate and other oven hardware can be made of suitable materials known in the oven arts which are correspondingly used with thermoplastic articles which are heated to above their melting temperatures.

The conveyor belt 21 can be made of a suitable material that can withstand the oven conditions, particularly the temperatures, and regular contact with the thermoplastic articles. The conveyor belt should allow release of the thermoplastic articles 23 with little or no sticking or deformation of the articles. Preferably, the conveyor belt is made of a thin material having a uniform flat surface. Example belt material includes fiber glass impregnated and coated with tetrafluoroethylene (TFE) resin, steel mesh impregnated and coated with TFE resin, or other fibrous or plastic laminates having the desired release properties and which can withstand the heating conditions.

The preferred conveyor belt material is a fiberglass belt impregnated and coated with TFE resin. There are a wide variety of glass fabrics impregnated and coated with TFE resins available in the marketplace. A suitable belt or fabric can be chosen to match the conditions of a particular oven and thermoplastic material it will be in contact with. The fiberglass is preferably woven. The belts should have a very smooth finish for quick release of the heated thermoplastic article. The belt should be between about 0.003 and about 0.016 inches thick, and weigh between about 0.28 to about 1.80 pounds per square yard. The width of the belt can vary as desired. The conveyor belt should have a breaking strength of between about 50 to about 400 pounds per inch of width. A Super-Smooth PTFE/Glass belt, about 0.006 inches thick, 0.60 pounds per yard, and having a breaking strength of about 100 to 120 pounds per inch of width manufactured by Oaks Material Group, Dodge Fluorglass Division, Hoosick Falls, N.Y. 12090, has been found to be the best belt material and size for heating thermoplastic sheets.

The belt can be driven by any suitable drive unit such as motor and drive unit 37. The tension in the conveyor belt can be controlled by a suitable tensioning unit such as the one generally shown as 39. The plate can be supported by any suitable supports such as support beams 41.

There can be any type of temperature control through the oven chamber 15 known in the oven art. A preferred type of control is control of the temperature with position in the oven chamber. Preferably, suitable means 43 are provided to control the means to heat the oven chamber and the heating plate in at least one zone along the direction of travel of the conveyor belt. There can also be control across the width of the oven. An infrared pyrometer 45 can be used to measure the exiting article temperature and signal a means to control heat imput to the oven zones.

There is suitable control of the conveyor belt so that each thermoplastic article moves a predetermined distance in the oven and remains at each location or zone for a predetermined length of time, i.e. the belt movement is indexed to the oven zones.

In the embodiment shown in the FIGURE, each zone is a separately controlled heating station where infrared heaters 31 define zone location. Each heater can be controlled to direct a desired amount of heat to the area beneath it. The heaters 31 used to heat thermoplastic sheets 23 can be as close as 3 to 4 inches above the conveyor belt. The portion of the heating plate corresponding to each infrared heater can also be controllable. In this way, as a thermoplastic article moves into a given zone it can be subjected to a controlled heating from each heating source.

The tension of the belt is preferably controllable. Tension control is important for support of the thermoplastic article to effect easier removal of the heated thermoplastic article at the outlet extension, and for uniform travel. The proper tension is determined based on the operating conditions, equipment size, size and shape of thermoplastic articles, etc. The belt can be maintained on a straight tracking course by suitable means known in the art. For example, the belt and pulleys or rolls over which it travels can be correspondingly keyed. Pulleys can be used which have extensions which are keyed to corresponding grommets along the belt edge.

The oven shown in the attached drawing and disclosed above can be used in a method to uniformly preheat thermoplastic articles such as the sheets 23 shown in the drawing. Thermoplastic articles are fed into the inlet of an oven chamber on a conveyor belt. The thermoplastic articles are conveyed through the oven. The articles are heated on a heating plate which is directly beneath the conveyor belt. The surface or portions of the thermoplastic articles not in contact with the conveyor belt and heated by the heating plate, are heated by a suitable heating means within the oven. The thermoplastic articles are then finally conveyed out of the oven chamber and collected at the oven outlet.

The preferred method of uniformly preheating the thermoplastic articles, such as sheets 23 shown in the attached FIGURE, is to feed the thermoplastic articles onto inlet extension 33 which extends outside the oven at the oven inlet 17. The thermoplastic articles are then conveyed into the inlet 17 of the oven chamber on the conveyor belt 21. The conveyor belt 21 conveys the thermoplastic sheets through the oven chamber 15. Heat is applied to the side of the sheet supported on the conveyor belt 21 by the heating plate 27. The surfaces and portions of the thermoplastic sheet 23 not in contact with the belt are heated by a suitable means within the oven chamber, such as infrared heating unit 31. The heated thermoplastic sheets 23 are conveyed to outlet extension 35. The heated thermoplastic sheets 23 are then removed at the outlet extension 35.

Optionally, the heating plate extending beneath the inlet extension of the conveyor belt or other suitable means can preheat the thermoplastic sheet prior to conveyance into the oven chamber. Additionally, the heating plate extending beneath the outlet extension of the conveyor belt or other suitable means can optionally be used to maintain the thermoplastic sheet at a desired temperature while awaiting removal or collection on the outlet extension of the belt.

A particularly preferred method of heating thermoplastic articles, such as sheets 23, is to feed the sheet onto inlet extension 33. The movement of the conveyor belt is indexed through motor and drive unit 37 so that it carries the sheet through the oven, stopping so that the sheet remains in each zone for a set time. The time and temperature are controlled depending on the construction of the particular oven and the size and shape, as well as polymer type, of the thermoplastic article being heated. The heating plate and oven chamber heating means should have the capacity to heat thermoplastic articles, such as polyamides, uniformly to at least 600° F. The heated thermoplastic article is conveyed out of the outlet to outlet extension 35 from which it is removed. Typically, the exit temperatures of thermoplastic polyamides, such as polyepsiloncaprolactam, sheets used as blanks for further operations is about 550° F. to 600° F. This requires an oven chamber temperature of about 600° F. to 700° F. and a heating plate temperature of at least 550° F. The temperatures of the oven chamber and heating plate within the various zones can be monitored and controlled. The control is preferably based on the measured temperature of the thermoplastic article. The article temperature can be remotely monitored by suitable means known in the art such as an infrared pyrometer. The measured temperature can be fed back to control the temperature in the various heating zones.

This method allows the feeding of thermoplastic articles, such as sheets, onto a conveyor belt to be conveyed through an oven chamber. The thermoplastic sheets are supported in a manner in which they are uniformly heated on the side supported on the belt. Of course, the surface or portion unsupported is uniformly heated by the means to heat the oven chamber. The conveyor belt is made of a material which easily releases the hot thermoplastic material. Further, when the outlet extension is used, the thermoplastic sheets can be removed with a minimum of handling problems and the conveyor belt can be cleaned as necessary.

The oven chamber can have suitable means by which it can be filled with an inert gas at a pressure slightly greater than ambient pressure. This prevents the article being heated from being exposed to moisture and oxygen. A preferred inert blanket is dry nitrogen at between about 1 and about 5 pounds per square inch pressure above atmospheric pressure.

Suitable thermoplastic materials which may be in articles heated in the oven of the present invention comprise a wide range of polymer compositions. Non-limiting examples include olefinic polymers such as polyethylene, polypropylene and copolymers and terpolymers thereof, e.g. copolymers of ethylene and ethyl acrylate; vinyl polymers comprising one or more of the following monomers: vinyl aryls such as styrene, o-phenylstyrene, m-phenylstyrene, p-phenylstyrene, o-methylstyrene, m-methylstyrene, p-phenylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene bromide, and the like; vinyl esters such as vinyl acetate, vinyl propionate, vinyl butyrate, vinyl chloroacetate, vinyl benzoate, and the like; polycarbonates, that is, thermoplastics containing the following repeating units:

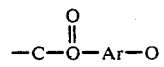

wherein Ar is the residue of an aromatic dihydric phenol; cellulose compounds, such as cellulose acetate, cellulose triacetate, cellulose acetate butyrate, cellulose propionate, ethyl cellulose, and the like; polyamides, polyesters such as polyethylene terephthalate, polyethylene isophthalate, poly(ethylene-2,7-naphthamate), polybutylene terephthalate, polypropylene terephthalate, copolymers thereof and the like; chlorinated polyethylene, chlorinated polyvinyl chloride, polyfluoroethylene, polytrifluorochloroethylene, polyhexafluoropropylene, copolymers thereof, such as copolymers of vinylidene fluoride and trifluorochlorocopolymers of vinylidene fluoride and trifluorochloroethylene, and the like, as well as mixtures of any of the above.

Also suitable for use herein are polyurethane polymers, polysulfone polymers, polyacetal polymers, halogenated olefins, and phenoxy polymers. Included in the term "polymer" are blends of two or more polymeric materials. Also contemplated within the term "polymer" are the metallic salts of those polymers or blends thereof which contain free carboxylic acid groups. Non-limiting examples of such polymers include ethylene-acrylic acid copolymers and ethylene-methacrylic acid copolymers. Illustrative of the metals which may be used to provide the salts of such carboxylic acid polymers are the mono-, di-, and tri- valent metals such as sodium, calcium and aluminum.

Preferred thermoplastic polymers are polyamides, polyolefins, and polyesters; more preferred are polyamides, and specific polyolefins such as polypropylene, polyethylene and the polyesters, polybutylene terephthalate and polyethylene terephthalate; most preferred are polyamides. Non-limiting examples of such polyamides are: (a) those prepared by the polymerization of lactams, preferably epsilon-caprolactam; (b) those prepared by the condensation of a diamine with a dibasic acid, preferably the condensation of hexamethylene diamine with sebacic acid; (c) those prepared by self-condensation of amino acids, preferably self-condensation of 11-aminoundecanoic acid; and (d) those based on polymerized vegetable oil acids, or random, block, or graft interpolymers consisting of two or more of these polyamides. Preferred are those obtained by the polymerization of epsilon-caprolactam. These include polycaprolactams containing (a) carboxyl groups attached to both ends of the polymer chain; (b) a carboxyl group attached to one end and an acetamide group attached to the other end of the chain; (c) amino groups attached to both ends of the polymer chain; and (d) a carboxyl group attached to one end and an amino group attached to the other end of the polymer chain.

Preferably the thermoplastic sheets of the present invention are reinforced with suitable fibers, which can include long and short glass fibers, carbon fibers, boron fibers, metal fibers, etc., and particulate fillers or plate-like fillers such as high aspect ratio mica. By high aspect aspect ratio, we mean the average diameter of the particle divided by its thickness is at least 20:1, preferably at least about 40:1, and more preferably about 50:1 to 200:1.

The term "long glass fibers" as used herein is intended to be employed in a broad sense to include glass mat, as well as individual continuous fibers, more particularly known as filaments, which have a length greater than about ½ inch; groups of twisted strands, more particular known as yarn or thread; untwisted or slightly twisted groups of strands, more particularly known as roving; discontinuous lengths of fibers, more particularly known as staple fibers, which can be spun into threads, twisted strands, roving or yarn. Preferred is glass fiber strand mat in the form of strands or bundles which are at least about 1 inch to continuous in length. This mat can be woven or nonwoven and if nonwoven, the strands or fibers are held together by resinous adhesive binders, mechanical interaction or by "needle punching". If woven, the strands or fibers are held together by mechanical interaction of the patterned weblike structure.

The strands are composed of a plurality of fibers usually numbering 2 to 400, preferably 5 to 120. The individual fiber diameter ranges from about 0.0002 to 0.001 inch, preferably 0.0003 to 0.0008 inch and the strand diameter measures at least 0.001 inch and preferably 0.0015 to 0.004 inch in diameter.

It is also within the scope of the present invention that other reinforcing fillers can be used alone or in combination with glass fibers. For example, the mica or glass reinforced thermoplastic of choice may also contain particulate fillers. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, felspar, asbestos, talc, calcium carbonates, clay, carbon black, quartz, novaculite, and other forms of silica, kaolinite, bentonite, garnet, saponite, beidellite, calcium oxide, wollastonite, calcium hydroxide, etc., as well as short reinforcing fibers (less than 2 inches in length) such as glass, metal, carbon, jute, hemp or sisal fibers. The fillers listed above are given as examples only and are not intended as a limitation on fillers that can be utilized in this invention. The fillers may be coated with sizing agents, coupling agent, adhesion promoters, wetting agents and the like, as are known to those skilled in the art. The precise amount of other reinforcing filler, can be determined by routine experimentation by those skilled in the art for any particular desired property or set of properties.

Other conventionally known additives of value in thermoplastic sheet formulations are also suitable for use herein. Nonlimiting examples of such additives include antistatic agents, plasticizers, lubricants, nucleating agents, impact modifiers, colorants, heat and light stabilizers, and other similar processing aids and adjuvants.

The long glass fiber strand, mica and other fillers described herein can be treated with a coupling agent which has the ability to enchance the bonding of the thermoplastic polymer with the chopped strand mat. The coupling agent can be applied to the individual fibers or other fillers during forming and/or to the strands in the mat. Non-limiting examples of such coupling agents suitable for use herein include chromic chloride complexes as well as various silane and siloxane materials such as hydrolyzable vinyl, alkyl, amino, methacryloxy, epoxy, and glycidoxy silanes as well as their hydrolysis products and polymers of the hydrolysis products and mixtures thereof. Preferred are the silanes and siloxanes; more preferred are the silanes. Also suitable, particularly for use with glass fibers, are one or more of the various types of sizing agents or coatings which are employed by those in the art. These sizing agents are usually multicomponent compositions which will comprise one or more lubricants, emulsifying agents, coupling agents, pH adjusters, film forming synthetic binders, antistatic agents and/or wetting agents and the like. Preferred are the aforementioned coupling agents.

The thermoplastic sheets suitable for use herein can be prepared by any conventionally acceptable means employed in the art such as by blending the filler or fillers and additives with a liquid thermoplastic resin (melted resin or solution or dispersion of the resin) or dry blending with resin pellets or the like. The sheet can then be formed by extruding, calendering or casting the blend into a sheet. Preferably, the blend is dry blended and fed to an extruder wherein it is extruded into a sheet having a thickness of, for example, about 5 to 250 mils, preferably 10 to 125 mils, and are cut into blanks of desired size.

Preferably the sheet is a multilayered glass mat reinforced laminate structure such as those taught in U.S. Pat. No. 4,044,188; U.S. Pat. No. 3,920,879 and U.S. patent application Ser. No. 889,573, filed Mar. 23, 1978, now abandoned, all of which are incorporated herein by reference. Such laminates can be prepared by any conventional means. For example, in the case of a two ply structure, two plies of thermoplastic sheeting are extruded or similarly produced; glass mat or its equivalent is then fed between the two plies; the proper combination of heat and pressure (supplied by laminating rolls or the like) is then used to fuse and laminate the two sheets and the glass fiber web, mat, or the like, together into an integral sheet construction. The sheets then can be cut to any desirable size for subsequent shaping.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiment of the invention set forth herein, but rather should be limited by the advance of which the invention has promoted the art.

What is claimed is:

1. An oven for uniformly heating thermoplastic articles comprising:
   an oven housing in which there is an oven chamber having an inlet and outlet;
   a conveyor belt passing through the oven chamber, the conveyor belt having an article bearing surface;
   a heating plate located directly beneath the article bearing surface and in direct contact with the conveyor belt to uniformly heat thermoplastic articles on the conveyor belt; and
   a means to heat the oven chamber.

2. The oven as recited in claim 1 wherein the conveyor belt and heating plate extend beyond the oven housing at the inlet whereby thermoplastic articles can be placed on the conveyor belt and heating plate outside of the oven chamber at the oven inlet.

3. The oven as recited in claim 1 or 2 wherein the conveyor belt and heating plate extend beyond the oven housing at the outlet whereby thermoplastic articles passing from the outlet of the oven chamber are supported on the conveyor belt and heating plate outside of the oven chamber at the oven outlet.

4. The oven as recited in claim 3 wherein the conveyor belt is made of a fiberglass belt impregnated with tetrafluoroethylene resin.

5. The oven as recited in claim 4 wherein the fiberglass belt is impregnated and coated with tetrafluoroethylene resins having a very smooth surface.

6. The oven as recited in claim 5 further comprising means to fill the oven chamber with an inert atmosphere at a pressure greater than atmosphere pressure.

7. The oven as recited in claim 5 wherein the conveyor belt is between about 0.003 and about 0.016 inches thick, and weighs between about 0.28 to about 1.80 pounds per square yard.

8. The oven as recited in claim 5 wherein the conveyor belt is between 2 and 3 feet wide.

9. The oven as recited in claim 5 wherein the conveyor belt is about 0.006 inches thick and 0.60 pounds per square yard.

10. The oven as recited in claim 4 further comprising a means to control the tension in the conveyor belt.

11. The oven as recited in claim 1 wherein the heating means are infrared heaters located to heat the thermoplastic articles supported on the conveyor belt.

12. The oven as recited in claim 11 wherein the oven chamber further comprises at least one zone along the direction of travel of the conveyor belt, and there is a means to control the oven chamber temperature and heating plate temperature in each zone.

13. The oven as recited in claim 12 wherein the movement of the conveyor belt is indexed to the location of each zone.

14. The oven as recited in claim 1 wherein the heating plate is heated by electric resistance elements.

15. The oven as recited in claim 1 wherein the thermoplastic articles are stampable sheet blanks which are preheated for further shaping.

16. A method of uniformly preheating thermoplastic articles in an oven having an oven chamber with an inlet and an outlet, there being a conveyor belt passing through the oven chamber, and a heating plate directly beneath the article bearing surface and in direct contact with the conveyor belt of the conveyor, the conveyor belt comprising the steps of:
    feeding thermoplastic articles into the inlet of the oven chamber on the conveyor belt;
    conveying the thermoplastic article through the oven chamber;
    heating the supported side of the thermoplastic article with the heating plate;
    heating the surface of the thermoplastic article not in contact with the belt by a heating means within the oven chamber; and
    collecting the heated thermoplastic articles at the oven outlet.

17. The method as recited in claim 16 further comprising the step of feeding the thermoplastic article on the conveyor belt and heating plate outside of the oven chamber inlet.

18. The method as recited in claim 16 or 17 further comprising the step of conveying the thermoplastic article beyond the outlet of the oven on the conveyor belt and heating plate outside of the oven outlet.

19. The method as recited in claim 16, wherein the oven chamber further comprises at least one zone along the direction of travel of the conveyor belt, and there is a means to control the oven chamber temperature and heating plate temperature in each zone, further comprising the step of controlling the oven chamber temperatures and heating plate temperatures in each zone.

20. The method as recited in claim 19 wherein the step of conveying further comprises stopping the belt so that the thermoplastic articles stop in each zone for a predetermined length of time.

21. The method as recited in claim 16 wherein the oven chamber is heated to between 550° F. and 600° F., and the heat plate is heated to at least 550° F.

* * * * *